United States Patent
Thomson et al.

[11] 3,781,021
[45] Dec. 25, 1973

[54] FLAME RESISTANT SEALS
[75] Inventors: Richard N. Thomson, Markfield, near Leicester; Michael F. Walker, Leicester, both of England
[73] Assignee: Dunlap Holdings Limited, London, England
[22] Filed: Aug. 23, 1971
[21] Appl. No.: 173,873

[30] Foreign Application Priority Data
Aug. 26, 1970 Great Britain.................. 40,920/70

[52] U.S. Cl.................. 277/164, 277/229, 277/235
[51] Int. Cl............................................ F16j 15/12
[58] Field of Search.................. 277/164, 138, 216, 277/220, 227, 229, 230, 232, 233, 234, 235, DIG. 8

[56] References Cited
UNITED STATES PATENTS
2,924,471  2/1960  Poltorak et al..................... 277/230
2,774,621  12/1956  Kilbourne..................... 277/DIG. 8

FOREIGN PATENTS OR APPLICATIONS
139,656  6/1902  Germany........................... 277/220

Primary Examiner—Samuel B. Rothberg
Assistant Examiner—Robert I. Smith
Attorney—Stevens, Davis, Miller & Mosher

[57] ABSTRACT

A flame-resistant seal which is transversely stiff and resistant to kinking and buckling made from a layer of asbestos fabric and a layer of metal braid embedded in a flame-resistant polymeric material, e.g., fluorocarbon rubber. The seal may have a round or P-shaped cross-section and may form a continuous loop; it may form a flame-resistant cover for a hose or a wire.

9 Claims, 6 Drawing Figures

PATENTED DEC 25 1973    3,781,021

FLAME RESISTANT SEALS

This invention relates to flame resistant tubular articles. Such articles may be utilized as seals to prevent or delay the spread of fire from one compartment to another or as protective covers for wires or hoses. Such articles are particularly useful in aircraft where delaying the effects of fire is essential for safety reasons.

Flame resistant seals generally comprise an asbestos fabric proofed with a flame-resistant rubber, such as is sold under the Trade Mark "Viton." Resilience is provided by incorporating a knitted wire mesh member inside the tubular section. While such assemblies give the requisite flame resistance controlled compression rates are not readily achieved with such constructions as the wire mesh does not provide a reliable resistance.

According to one aspect of the present invention a flame resistant article comprises a layer of asbestos fabric and a layer of metal braid embedded in flame resistant polymeric material wherein the metal braid provides a predetermined degree of resistance to compression of the article.

According to another aspect of the invention the layer of metal braid is substantially cylindrical. The polymeric material is preferably fluorocarbon rubber.

Another aspect of the invention provides a flame resistant seal. The seal may have a round or P-shaped cross-section and may be a continuous loop. Alternatively the seal may be assembled into a loop in situ and other embodiments of the invention disclose permanent and reusable means of assembly.

Still another aspect of the invention provides a flame resistant cover for a hose or wire comprising a cylindrical cover as above which is fitted over the hose or wire.

Some embodiments of the present invention will now be described, by way of example only, in conjunction with the diagrammatic drawings in which.

Figure 1:
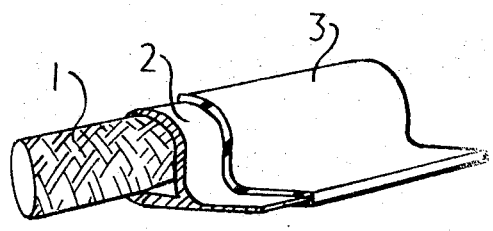
FIG. 1 is a perspective of a P-section seal according to the invention which is sectioned stepwise.

The P-section seal shown in FIG. 1 is manufactured as follows. A wire braid is woven using a conventional braiding machine onto a rigid mandrel of a diameter slightly larger than the required internal diameter of the seal. A length of wire braid 1 slightly larger than the length of seal required is then cut and positioned on a moulding mandrel having an external diameter the same as the internal diameter of seal required. The braid is stretched along the mandrel so that it snugly fits and the ends are taped to the mandrel ends to prevent the braid springing from the mandrel due to the resilience of the wire. A strip of asbestos cloth 2 is then wrapped over the braid, the edges of the strip are brought together, interleaved by a strip of unvulcanized fluorocarbon rubber 0.010 inches thick and the edges are stapled together to facilitate subsequent handling.

An outer ply 3 of calendered, unvulcanized fluorocarbon rubber is applied and the edges are stapled together as before. Finally, the assembly is cured in a mould having an internal section of the required P-shape and finally the finished seal is removed from the mandrel and the mould.

The resultant seal has a smooth external finish and has less tendency to kink or locally buckle than other types of fire resistant seals when bent into an arc. The smooth finish is particularly advantageous as it allows good sealing to contacting surfaces.

The transverse stiffness, or spring rate, in a direction normal to the length of the seal may be adjusted by selection of the wire braid parameters, e.g., wire diameter, number of wires per carrier, number of carriers, braid angle. If required this stiffness may be decreased locally to accommodate an excrescence in the contacting member and this may be allowed by cutting the braid through approximately half its circumference at intervals after positioning on the curing mandrel or before applying the asbestos cloth. Such cuts, for example, at 1–2 inches spacing, reduce the transverse stiffness by permitting limited relative movement of the cut lengths of wire.

The rubber used for the seal may be of types other than fluorocarbon rubber and any of the usual flame resisting rubbers may be utilized.

The rubber is itself a flame resistant barrier but will burn under the action of a continuously applied high temperature flame. It is therefore preferable to use a rubber which forms a cohesive ash which is retained in position by this self cohesion and the action of the underlying wire braid.

The asbestos further assists the maintaining of the rubber in the form of the seal and acts on its own as a barrier to the flame impinging on the fire side of the seal.

An alternative construction is to apply the asbestos in the form of a braid to the moulding mandrel and stretch it to obtain a snug fit and then to apply the wire braid over the asbestos. In this construction the asbestos braid assists removal of the seal from the mandrel.

Figure 2:
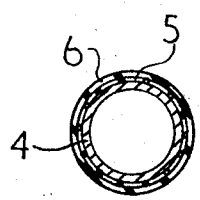
FIG. 2 is a cross-section of a round section seal.

Other seal sections may be made and FIG. 2 shows a round section seal comprising an asbestos braid 4, a wire braid 5 and an outer layer of fluorocarbon rubber.

Some applications of flame resistant seals require endless seals, for example, in the form of a toroid of large internal diameter relative to its cross-section. However, in some cases it is inconvenient to fit such a seal as a closed ring and it is desirable to close the ring after fitting. For example, it would be necessary to remove an aircraft engine to fit a peripheral closed ring seal whereas a seal with an openable joint could be fitted with the engine in place.

Figure 3:
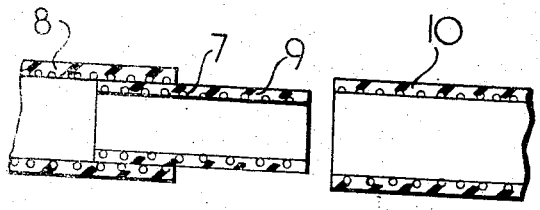
FIG. 3 is a longitudinal section of one form of seal joint.

One form of joint for seals as described above is shown in FIG. 3 and comprises an asbestos reinforced flame resistance rubber jointing tube 7 constructed in the same manner as the main seal 8. The jointing tube 7 is bonded into the seal 8 so that it forms a projecting tube 9 having an external diameter to fit inside the other end 10 of the seal. The inner surface of the end 10 and the outer surface of the projecting tube 9 are coated with an adhesive on assembly and formed into contact whereupon the continuous seal results.

Figure 4:
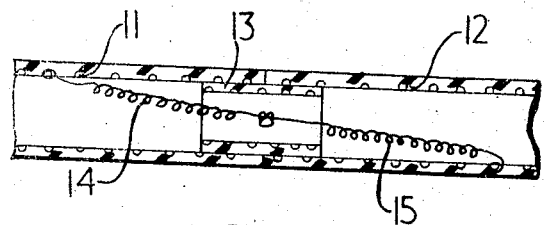
FIG. 4 shows an alternative reusable joint.

Another form of joint which allows the connection to be broken and remade is shown in FIG. 4. A short joining tube 13 is bonded into one end 11 of the seal and the other end is slid over the joining tube. It is retained in position by means of two springs 14, 15 each of which is anchored to a wire of the seal reinforcement, which are hooked together on assembly.

Figure 5:
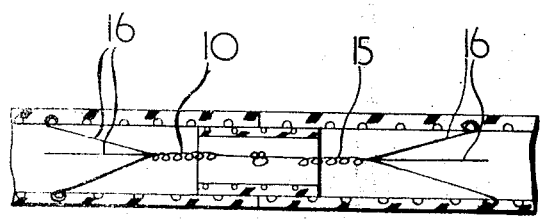
FIG. 5 shows another reusable joint.

A further embodiment is shown in FIG. 5 which allows the two springs 14, 15 to pull more evenly. Each spring is connected to three wires which are anchored to the wire braid on equally spaced portions such that the springs act in the axial direction of the seal.

Figure 6:
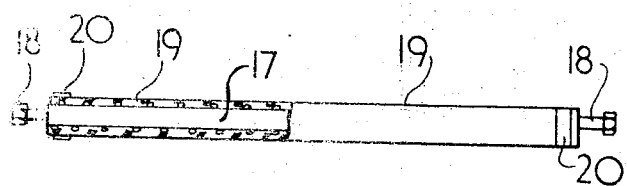
FIG. 6 shows a flame resistant hose.

A further application of a round section seal is for making wires or hose flame resistant. One such application is shown in FIG. 6 in which a hydraulic hose 17 having rigid end couplings 18 is covered by a tubular cover 19 made as the round seal of the second embodiment described above. The cover 19 is attached to each end fitting by a clip 20 and acts as a flame barrier as before; it is a loose fit over the hose 17 (not shown in the drawing) the small air space being considered to reduce the conduction of heat. As an alternative to a hose a wire or bunch of wires may be protected.

Having now described our invention what we claim is:

1. A flame resistant seal comprising a layer of asbestos fabric and a layer of metal braid embedded in flame resistant polymeric material to form a main tube and means joining the ends thereof to form a continuous ring, the joining means comprising a joining tube having an external diameter substantially the same as the internal diameter of the main tube, the joining tube extending into both ends of the main tube, the ends being biased toward each other by a tension spring anchored adjacent each end of the main tube to maintain the ends in abutting relationship over the joining tube.

2. A flame resistant article as in claim 1 wherein the layer of metal braid is substantially cylindrical.

3. A flame resistant article as in claim 2 wherein the article is in the form of a longitudinally extending P-section tube and the cylindrical metal braid extends only in the circular section of the tube.

4. A flame resistant article as in claim 2 wherein the metal braid is over the layer of asbestos fabric in the circular section of the tube.

5. A flame resistant article as in claim 2 wherein the layer of asbestos fabric is over the metal braid in the circular section of the tube.

6. A flame resistant article as in claim 2 wherein the polymeric material is fluorocarbon rubber.

7. A flame resistant seal according to claim 1 wherein the springs are anchored to the metal braid of the tube.

8. A flame resistant seal according to claim 7 wherein each spring is anchored by means of at least two wires attached to the spring, extending in equally spaced relationship about the axis of the tube and anchored to the tube such that the spring acts substantially axially of the tube.

9. A flame resistant seal according to claim 1 wherein the metal braid is transversely cut at least partly through the cross-section of the seal to effect a localized reduction in the resistance to compression of the seal.

* * * * *